(12) United States Patent
Kobayashi et al.

(10) Patent No.: US 6,221,461 B1
(45) Date of Patent: Apr. 24, 2001

(54) BIAXIALLY ORIENTED LAMINATED POLYESTER FILM CONTAINING AT LEAST TWO DIFFERENT LUBRICANT PARTICLES

(75) Inventors: Ieyasu Kobayashi; Toshifumi Osawa, both of Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/119,450

(22) Filed: Jul. 21, 1998

(30) Foreign Application Priority Data

Jul. 22, 1997 (JP) .................................................. 9-195750

(51) Int. Cl.[7] ........................................................ B32B 5/16
(52) U.S. Cl. .......................... 428/143; 428/212; 428/216; 428/323; 428/336; 428/480
(58) Field of Search .................................. 428/323, 212, 428/213, 143, 336, 480, 216

(56) References Cited

U.S. PATENT DOCUMENTS

| Re. 36,271 | * | 8/1999 | Inaba et al. ........................ 428/215 |
| 4,812,358 | * | 3/1989 | Miyake et al. ..................... 428/323 |
| 4,818,581 | * | 4/1989 | Katoh et al. ....................... 428/143 |
| 5,270,096 | * | 12/1993 | Kato et al. ......................... 428/143 |
| 5,407,725 | * | 4/1995 | Ryoke et al. ...................... 428/141 |
| 5,532,047 | * | 7/1996 | Okazaki et al. ................... 428/213 |
| 5,670,236 | * | 9/1997 | Kotani et al. ..................... 428/141 |
| 5,919,550 | * | 7/1999 | Koseki et al. ..................... 428/141 |
| 5,958,568 | * | 9/1999 | Mizutani et al. .................. 428/216 |

FOREIGN PATENT DOCUMENTS

| 609060 A1 | 9/1994 | (EP) . |
| 710547 A1 | 5/1996 | (EP) . |
| 9-169093 | 6/1930 | (JP) . |
| 5-301283 | 11/1993 | (JP) . |
| 5-309728 | 11/1993 | (JP) . |
| 6-126830 | 5/1994 | (JP) . |
| 8-217892 | 8/1996 | (JP) . |

* cited by examiner

*Primary Examiner*—H. Thi Le
(74) *Attorney, Agent, or Firm*—Sughrue, Mion, Zinn, Macpeak & Seas, PLLC

(57) ABSTRACT

A biaxially oriented laminate polyester film in which each of the layers contains at least two different lubricant particles, and each of two members out of the lubricant particles of one layer and each of two members out of the lubricant particles of the other layer have the same substrates and the same average particle diameters, respectively, the biaxially oriented laminate polyester film enables the direct recycling of the recovered polymer for production of the film.

16 Claims, No Drawings

BIAXIALLY ORIENTED LAMINATED POLYESTER FILM CONTAINING AT LEAST TWO DIFFERENT LUBRICANT PARTICLES

DETAILED DESCRIPTION OF THE INVENTION

The present invention relates to a biaxially oriented laminate polyester film. More specifically, it relates to a biaxially oriented laminate polyester film which enables the direct recycling of a reproduction polymer for the production of a film (to be referred to as "self-recyclability" hereinafter), has excellent electromagnetic conversion characteristics as a base film for a high-density magnetic recording medium and excellent winding and handling properties as a base film.

A biaxially oriented polyester film typified by a polyethylene terephthalate film is used for a wide range of applications, particularly as a base film for a magnetic recording medium, due to its excellent physical and chemical properties.

Along with recent efforts made to increase the density and capacity of a magnetic recording medium, a base film is desired to be flatter and thinner. However, when the surface of the base film is flattened to maintain excellent electromagnetic conversion characteristics, its slipperiness becomes insufficient. For instance, when the base film is rolled, it is wrinkled or has blocking with the result that the surface of the film roll becomes uneven, thereby reducing the yield of products and narrowing the appropriate ranges of tension, contact pressure and speed for winding the base film, whereby it is made extremely difficult to wind the base film. When the slipperiness of the base film is low in the film processing step, the friction of the base film with a metal roll increases, thereby producing abrasion dust which causes the lack of a magnetic recording signal or drop-out.

To improve the slipperiness of a polyester film, the following two methods to impart unevenness to the film surface are generally employed: (i) one in which inert particles are deposited from a residual catalyst in a raw material polymer in the production process and (ii) one in which inert particles are incorporated. Generally speaking, the larger the size and content of particles contained in the film the more the slipperiness of the film is improved.

Meanwhile, as described above, the surface of a base film is desired to be as even as possible in order to improve electromagnetic conversion characteristics. When a magnetic recording medium is formed from the base film having a rough surface, the unevenness of the surface of the base film appears on the surface of a magnetic layer even after the formation of the magnetic layer, thereby deteriorating electromagnetic conversion characteristics.

In this case, the larger the size and content of particles contained in the base film the greater the surface roughness of the base film becomes, thereby deteriorating electromagnetic conversion characteristics.

To improve both winding properties and electromagnetic conversion characteristics, which are contradictive to each other, there is a widely known means for having a base film laminated, in which one surface on which a magnetic layer is formed, of the base film is flattened for improving electromagnetic conversion characteristics and the other surface thereof is roughened for improving slipperiness.

In this case, a lubricant having a small particle diameter is used or the amount of the lubricant added is reduced to flatten the layer on the side on which the magnetic layer is formed whereas a lubricant having a large particle diameter is used or the amount of the lubricant added is increased to roughen the layer on the other side (running surface side) on which no magnetic layer is formed.

That is, the flat layer on the coating surface side and the rough layer on the running surface side greatly differ from each other in the characteristic properties of a lubricant used, such as species, particle diameter and amount.

In the case of a single-layer film, film waste produced in the production process of a film is recovered and made into chips, and the obtained chips can be recycled directly for the production of the film. In the case of a laminate film, however, the lubricant composition of chips recovered from a laminate film differs from the lubricant compositions of a rough layer and a flat layer of the laminate film. Therefore, when such chips are used for the production of a laminate film, the lubricant composition of a layer made from the recycled chips suffers a change, resulting in causing changes in the characteristic properties of the film.

Meanwhile, it has recently been proposed to use chips recovered from the laminate film in an intermediate layer portion (core layer portion) of a three-layer laminate film.

In this method, however, the intermediate layer portion must be thick enough to consume chips recovered from the laminate film as well as chips recovered from the three-layer laminate film. Therefore, the three-layer laminate film must be extremely thick. When chips containing a lubricant having a large particle diameter or a large amount of a lubricant are used even in an intermediate portion, they influence the formation of protrusions on a surface layer portion. Therefore, the use of the chips is limited.

As described above, a magnetic recording medium having a higher density and larger capacity and a base film having a smaller thickness have recently been demanded. Therefore, the thickness of the above three-layer laminate film is reduced, and it is substantially difficult to recycle chips recovered from the laminate film for the intermediate layer of the above three-layer film.

It is therefore the current situation that the chips recovered from the laminate film is scrapped, thereby boosting the costs of the film. Such scrapped films are disposed of as industrial waste but it is now difficult to dispose of such films.

It is an object of the present invention to provide a biaxially oriented laminate polyester film which enables the direct recycling of a reproduction polymer for the production of a film, that is, to provide a biaxially oriented laminate polyester film having self-recyclability.

It is another object of the present invention to provide a biaxially oriented laminate polyester film which has self-recyclability and excellent winding and handling properties and which can be used as a base film for a high-density magnetic recording medium having excellent electromagnetic conversion characteristics.

Other objects and advantages of the present invention will become apparent from the following description.

According to the present invention, the above objects and advantages of the present invention can be attained by a biaxially oriented laminate polyester film composed of polyester compositions and comprising two adjacent layers which differ from each other in surface roughness, wherein:

each of the layers contains at least two different lubricant particles, and each of two members out of the lubricant particles of one layer and each of two members out of the lubricant particles of the other layer have the same substrates and the same average particle diameters, respectively, and are contained in such amounts that satisfy the following expressions (1) to (3):

$$W_A(I)/W_A(II)=(0.95–1.05) \times W_S(I)/W_B(II) \quad (1)$$

$$W_A(I)<W_B(I) \quad (2)$$

$$W_A(II)<W_B(II) \quad (3)$$

wherein $W_A(I)$ is a content (wt %) of lubricant particles I having the largest average particle diameter out of the lubricant particles contained in the first layer (layer A), $W_A(II)$ is a content (wt %) of lubricant particles II having the second largest average particle diameter out of the lubricant particles contained in the first layer, $W_B(I)$ is a content (wt %) of lubricant particles I having the largest average particle diameter out of the lubricant particles contained in the second layer (layer B), and $W_B(II)$ is a content (wt %) of lubricant particles II having the second largest average particle diameter out of the lubricant particles contained in the second layer.

The polyester in the present invention is an aromatic polyester comprising an aromatic dicarboxylic acid as a main acid component and an aliphatic glycol as a main glycol component. The polyester is substantially linear and has film forming properties, particularly film forming properties by melt molding. Illustrative examples of the aromatic dicarboxylic acid include terephthalic acid, naphthalenedicarboxylic acid, isophthalic acid, diphenoxyethane dicarboxylic acid, diphenyl dicarboxylic acid, diphenyl ether dicarboxylic acid, diphenyl sulfone dicarboxylic acid, diphenyl ketone dicarboxylic acid, anthracenedicarboxylic acid and the like. Illustrative examples of the aliphatic glycol include polymethylene glycols having 2 to 10 carbon atoms such as ethylene glycol, trimethylene glycol, tetramethylene glycol, pentamethylene glycol, hexamethylene glycol and decamethylene glycol; and alicyclic diols such as cyclohexane dimethanol.

The preferred polyester is a polyester comprising alkylene terephthalate or alkylene naphthalate as a main constituent component. The polyester is particularly preferably polyethylene terephthalate, polyethylene-2,6-naphthalene dicarboxylate or a copolymer which comprises terephthalic acid or 2,6-naphthalenedicarboxylic acid in an amount of 80 mol % or more, based on the whole dicarboxylic acid components, and ethylene glycol in an amount of 80 mol % or more, based on the whole glycol components. 20 mol % or less of the whole acid components may be the above listed aromatic dicarboxylic acids other than terephthalic acid or 2,6-naphthalenedicarboxylic acid; aliphatic dicarboxylic acids such as adipic acid and sebacic acid; alicyclic dicarboxylic acids such as cyclohexane-1,4-dicarboxylic acid; and the like. 20 mol % or less of the whole glycol components may be the above listed glycols other than ethylene glycol; aromatic diols such as hydroquinone, resorcin and 2,2-bis(4-hydroxyphenyl) propane; aliphatic diols having an aromatic ring such as 1,4-dihydroxydimethyl benzene; polyalkylene glycols (polyoxyalkylene glycols) such as polyethylene glycol, polypropylene glycol and polytetramethylene glycol; and the like.

The polyester in the present invention includes polyesters obtained by copolymerizing or bonding a component derived from an oxycarboxylic acid such as an aromatic oxyacid, e.g., hydroxybenzoic acid and aliphatic oxyacid, e.g., ω-hydroxycaproic acid in an amount of 20 molt % or less, based on the total of dicarboxylic acid components and oxycarboxylic acid components.

The polyester in the present invention further includes polyesters obtained by copolymerizing a polycarboxylic acid or polyhydroxy compound having 3 or more functional groups, such as trimellitic acid or pentaerythritol, in such an amount that it is substantially linear, for example, in an amount of 2 mol % or less, based on the whole acid components.

The above polyester is known per se and can be produced by a known method per se.

The above polyester preferably has an intrinsic viscosity, measured at 35° C. in o-chlorophenol, of 0.4 to 0.9, more preferably 0.5 to 0.7, particularly preferably 0.51 to 0.65.

The biaxially oriented laminate polyester film of the present invention comprises the first layer, that is, layer A and the second layer, that is, layer B. The polyesters of the two layers may be the same or different, but preferably the same.

The biaxially oriented laminate polyester film of the present invention has self-recyclability that the film can recover and recycle itself for the production thereof, and there is a difference in surface roughness between the two surfaces of the film. The recovered film can be used in the layer A.

In the present invention, the polymers of the layers A and B of the laminate film contain at least two different lubricant particles. Each of two members out of the lubricant particles of the first layer and each of two members out of the lubricant particles of the second layer have the same substrates and the same average particle diameters, respectively. The same substrate means that the two different lubricant particles are derived from the same chemical species and the same average particle diameter means that the two different lubricant particles have the same average particle diameter, as a matter of course.

The above two lubricant particles contained in each of the two layers further have further the following relationships (1) to (3).

$$W_A(I)/W_A(II)=(0.95–1.05) \times W_B(I)/W_B(II) \quad (1)$$

$$W_A(I)<W_B(I) \quad (2)$$

$$W_A(II)<W_B(II) \quad (3)$$

wherein $W_A(I)$ is a content (wt %) of lubricant particles I having the largest average particle diameter out of the lubricant particles contained in the first layer (layer A), $W_A(II)$ is a content (wt %) of lubricant particles II having the second largest average particle diameter out of the lubricant particles contained in the first layer, $W_B(I)$ is a content (wt %) of lubricant particles I having the largest average particle diameter out of the lubricant particles contained in the second layer (layer B), and WB(II) is a content (wt%) of lubricant particles II having the second largest average particle diameter out of the lubricant particles contained in the second layer.

That is, by making the content of the lubricant contained in the layer A smaller than the content of the lubricant contained in the layer B (the above relationships (2) and (3)), the surface of the layer A (flat layer) forming a magnetic layer-coated surface can be flatter than the surface of the layer B (rough layer) forming a running surface, thereby making it possible to improve the electromagnetic conversion characteristics and winding and handling properties of the film.

When the relationship between the content of the lubricant contained in the layer A and that in the layer B satisfies the above expression (1), a laminate polyester film having self-recyclability can be obtained. In the above relationship (1), a value of (0.95–1.05) is a coefficient indicative of an error of 5% or less, which is inevitably produced when lubricants are added or weighed.

That is, when a recovery cycle is repeated with composition which does not satisfy the above relationships, the composition of lubricants starts to differ from the initial composition and the resulting composition of the lubricants must be adjusted to the initial composition thereof, thereby interfering with process control and quality control.

According to the present invention, there is advantageously provided a biaxially oriented polyester film in which part of a polyester composition forming the first layer is a recovered polyester composition having the same composition as the laminate polyester film of the present invention.

The lubricant particles contained in the layers A and B of the present invention are not particularly limited, but they are at least two different lubricant particles. The lubricant is preferably a multi-component lubricant containing larger particles in such a small amount that does not deteriorate electromagnetic conversion characteristics and smaller particles in a larger amount than the larger particles to provide slipperiness. When the lubricant is a single-component lubricant consisting of small particles alone, sufficient air squeezability cannot be obtained and winding and handling properties are insufficient. When the single-component lubricant consists of medium-sized particles and large particles and is used in a large amount, electromagnetic conversion characteristics deteriorate and when it is used in a small amount, the slipperiness of the resulting film is insufficient. Therefore, it is difficult to achieve both excellent electromagnetic conversion characteristics and slipperiness at the same time with a single-component lubricant.

The lubricant particles contained in the above laminate film are preferably heat resistant polymer particles and/or spherical silica particles. More preferably, larger particles are heat resistant polymer particles or spherical silica, and smaller particles are spherical silica. Illustrative examples of the heat resistant polymer particles include cross-linked polystyrene resin particles, cross-linked silicone resin particles, cross-linked acryl resin particles, cross-linked styrene-acryl resin particles, cross-linked polyester particles, polyimide particles, melamine resin particles and the like. Of these, cross-linked polystyrene resin particles and cross-linked silicone resin particles are preferred because the effect of the present invention becomes more remarkable when these are contained in the laminate film of the present invention.

By using the above heat resistant polymer particles and spherical silica particles, protrusions that have affinity with polyesters and are relatively uniform in size are formed, thereby improving the slipperiness, abrasion resistance and electromagnetic conversion characteristics of the film.

The average particle diameter of the lubricant particles I having the largest average particle diameter contained in each of the polyester compositions of the first layer and the second layer is preferably 0.1 to 2.0 μm, more preferably 0.2 to 1.0 pm, particularly preferably 0.2 to 0.6 μm.

The content ($W_A(I)$) of the lubricant particles I having the largest average particle diameter contained in the polyester composition of the first layer is preferably 0.0005 to 0.6 wt %, more preferably 0.001 to 0.3 wt %, particularly preferably 0.002 to 0.2 wt %, based on the polyester composition.

The content ($W_B(I)$) of the lubricant particles I having the largest average particle diameter contained in the polyester composition of the second layer is preferably 0.005 to 1.0 wt %, more preferably 0.01 to 0.5 wt %, particularly preferably 0.02 to 0.4 wt %, based on the polyester composition.

The average particle diameter of the lubricant particles II having the second largest average particle diameter contained in each of the polyester compositions of the first and second layers is preferably 0.01 to 1.0 μm, more preferably 0.02 to 0.6 μm, particularly preferably 0.05 to 0.3 μm.

The content ($W_A(II)$) of the lubricant particles II having the second largest average particle diameter contained in the polyester composition of the first layer is preferably 0.005 to 1.0 wt %, more preferably 0.01 to 0.5 wt %, particularly preferably 0.02 to 0.3 wt %, based on the polyester composition.

The content ($W_B(II)$) of the lubricant particles II having the second largest average particle diameter contained in the polyester composition of the second layer is preferably 0.05 to 2.0 wt %, more preferably 0.1 to 1.0 wt %, particularly preferably 0.2 to 0.5 wt %, based on the polyester composition.

The standard deviation value of the lubricant particles having the largest average particle diameter contained in each of the polyester compositions of the first layer and the second layer is preferably 0.5 or less, more preferably 0.4 or less. The standard deviation value of the lubricant particles having the second largest average particle diameter contained in the same is preferably 0.5 or less, more preferably 0.2 or less.

The difference between the intrinsic viscosity of the polymer of the first layer A and that of the second layer B of the laminate polyester film of the present invention is preferably 0.10 or less, more preferably 0.05 or less, particularly preferably 0.02 or less. When the difference is more than 0.10, a difference is liable to be made in flowability at the junction of the polymers in the film formation with the result that the thickness of the layer A and that of the layer B in a width direction are liable to be non-uniform and the surface properties of the layer A and those of the layer B in the width direction may become non-uniform.

In the present invention, the surface roughness of the rough layer and flat layer of the biaxially oriented laminate polyester film is not particularly limited. However, when it is used as a base film for a high-density magnetic recording medium, particularly a high-density digital recording medium, the surface roughness of the layer A (WRa(A)) is preferably 0.5 to 5 nm, more preferably 1.0 to 4.5 nm, particularly preferably 2.0 to 4.0 nm. When WRa(A) is more than 5.0 nm, sufficient electromagnetic conversion characteristics cannot be obtained. On the other hand, when WRa(A) is less than 0.5 nm, the slipperiness of the resulting film deteriorates and sufficient slit yield cannot be obtained. In addition, slipperiness between the flat surface and a pass roll system in the production process of a film or tape deteriorates, and in consequence, the film or tape wrinkles due to a transporting failure, thereby greatly reducing the yield of products.

The WRa(B) of the rough layer is preferably 2.0 to 7.0 nm, more preferably 4.0 to 6.0 nm, particularly preferably 4.5 to 5.5 nm. When WRa(B) is less than 2.0 nm, the slipperiness of the resulting film is low and sufficient slit yield cannot be obtained. On the other hand, when WRa(B) is more than 7 nm, the influence of protrusions on the flat surface becomes large, the flat surface is roughened, and sufficient electromagnetic conversion characteristics cannot be obtained.

Preferably, the laminate polyester film of the present invention has Young's modulus in longitudinal and transverse directions of 450 to 2,000 kg/mm$^2$, and the ratio of the Young's modulus in a transverse direction to the Young's modulus in a longitudinal direction is 0.4 to 3.0. Young's modulus in longitudinal and transverse directions are more preferably 550 to 1,200 kg/mm$^2$, particularly preferably 600 to 900 kg/mm$^2$. The ratio of the Young's modulus in a transverse direction to the Young's modulus in a longitudinal direction is more preferably 0.5 to 2.5, particularly preferably 0.6 to 1.6.

When the Young's modulus in a longitudinal direction of the film is less than 450 kg/mm$^2$, the strength in a longitudinal direction of a magnetic tape becomes weak with the result that the magnetic tape is easily broken when it is set in hardware and a strong force is exerted thereon in a longitudinal direction. On the other hand, when the Young's modulus in a transverse direction is less than 450 kg/mm$^2$, the strength in a transverse direction of a magnetic tape becomes weak, the contact between the tape and the magnetic head becomes insufficient, and hence, satisfactory electromagnetic conversion characteristics cannot be obtained. Furthermore, when at least either the Young's modulus in a longitudinal direction or that in a transverse direction is more than 2,000 kg/mm$^2$, the resulting film ruptures frequently due to a high stretching ratio at the time of film formation, thereby greatly reducing the yield of products.

When the ratio of the Young's modulus in a transverse direction to the Young's modulus in a longitudinal direction is less than 0.4, the resulting magnetic tape cannot have sufficient strength in a transverse direction, the contact between the tape and the magnetic head becomes insufficient, and satisfactory electromagnetic conversion characteristics cannot be obtained. On the other hand, when the ratio of the Young's modulus in a transverse direction to the Young's modulus in a longitudinal direction is more than 3.0, the resulting magnetic tape cannot have sufficient transverse strength, whereby the tape ruptures frequently when it is set in hardware and a strong force is exerted thereon in a longitudinal direction.

The polyester in the present invention is not particularly limited, but preferably polyethylene terephthalate or polyethylene-2,6-naphthalene dicarboxylate. Particularly, polyethylene-2,6-naphthalene dicarboxylate is more preferred to obtain a biaxially oriented film having a thickness of 6 μm or less and high Young's modulus.

The total thickness of the laminate film of the present invention is not particularly limited. However, when the laminate film of the present invention is used as a base film for a high-density magnetic recording medium, the total thickness of the laminate film is preferably 2 to 10 pm, more preferably 3 to 7 μm, particularly preferably 3 to 6 μm. When the thickness is more than 10 μm, the length of a magnetic tape which can be set in a cassette is small and hence, a sufficient recording capacity cannot be obtained. On the other hand, when the thickness is less than 2 μm, the resulting film ruptures frequently at the time of film formation, and film winding properties become poor, thereby greatly reducing yield. Further, the flat layer becomes thin, the influence of the protrusions of the rough layer on the flat layer becomes large, and sufficient electromagnetic conversion characteristics cannot be obtained.

In the laminate film of the present invention, preferably, the thickness of the first layer is larger than the thickness of the second layer and the thickness of the second layer is 0.1 to 5 μm.

The biaxially oriented laminate polyester film of the present invention is preferably used as a base film for a high-density magnetic recording medium or a high-density digital recording medium (such as a data cartridge or digital video tape).

The biaxially oriented laminate polyester film of the present invention can be produced in accordance with a conventionally known process or a process accumulated in the prior art. For example, the biaxially oriented laminate polyester film can be obtained by first preparing an unoriented laminate film and then biaxially orienting the resulting film. This unoriented laminate film can be produced by a conventionally known process for producing a laminate film. For example, a process in which a polyester layer forming a rough surface and a polyester layer forming an opposite surface (flat surface) are laminated together in a state where the polyesters are molten or solidified by cooling can be employed. More specifically, the laminate film can be produced by methods such as co-extrusion, extrusion lamination or the like.

The unstretched laminate film obtained by the above methods can be formed into a biaxially oriented film in accordance with conventionally used methods for producing a biaxially oriented film. For example, polyesters are molten and co-extruded at a temperature between a melting point (Tm: ° C.) and (Tm+70)° C. to obtain an unstretched laminate film, the unstretched laminate film is then stretched to 2.5 times or more, preferably 3 times or more, in a uniaxial direction (longitudinal direction or transverse direction) at a temperature between (Tg−10)° C. and (Tg+70)° C. (Tg: glass transition temperature of polyesters) and then to 2.5 times or more, preferably 3.0 times or more, in a direction perpendicular to the above stretching direction at a temperature between Tg° C. and (Tg+70)° C. The obtained biaxially oriented laminate film may further be stretched in a longitudinal direction and/or transverse direction as required. The total stretch ratio is preferably 9 times or more, more preferably 12 to 35 times, particularly preferably 15 to 30 times in terms of area stretch ratio. The biaxially oriented film may further be heat set at a temperature between (Tg+70)° C. and (Tm−10)° C., for example, between 180° C. and 250° C. The heat setting time is preferably 1 to 60 seconds.

Various physical properties and characteristic properties in the present invention were measured and are defined as follows.

(1) Average Particle Diameter of Particles (DP)

The polyester is removed from the film by a low-temperature plasma etching treatment (for example, the model P3-3 of Yamato Kagaku Co., Ltd.) to expose particles. Process conditions are chosen that ensure that though the polyester is ashed, the particles are not damaged. The exposed particles are observed under a SEM (Scanning Electron Microscope) and an image of the particles (light and shade formed by the particles) is analyzed with an image analyzer. The following numerical processing is carried out with 5,000 or more particles at multiple observation sites and a number average particle diameter d obtained by the expression (4) is taken as an average particle diameter.

$$d = \Sigma di/n \qquad (4)$$

wherein di is a circle equivalent diameter (μm) of the particles and n is the number of the particles.

(2) Content of Particles

A sample is dissolved in a solvent which dissolves the polyester but not the particles, the particles are separated from the resulting solution by centrifugation, and the ratio (wt %) of the quantity of the particles to the total quantity is taken as the content of the particles.

(3) Layer Thickness

The concentration ratio ($M^+/C^+$) of an element ($M^+$) derived from the most highly concentrated particle of those contained in the film in the range of from the surface layer up to a depth of 3,000 nm to the carbon element ($C^+$) of the polyester is taken as a particle concentration, and the portion from the surface layer up to a depth of 3,000 nm is analyzed in the thickness direction, using a secondary ion mass spectrometer (SIMS). Although the particle concentration is low in the surface layer which is an interface, it becomes higher as the distance from the surface increases. Once reaching the maximal value, the particle concentration begins to decrease again. Based on this concentration distribution curve, a depth (deeper than a depth at which the particle concentration becomes maximal) at which the particle concentration of the surface layer becomes a half of the maximal value is determined and taken as the thickness of the surface layer.

Measurement conditions are as follows.

Species of primary ions: $O_2^+$

Primary ion acceleration voltage: 12 KV

Primary ion current: 200 nA

Luster area: 400 μm□

Analysis area: 30% of gate

Measurement vacuum degree: $6.0 \times 10^{-3}$ Torr

E-GUN: 0.5 KV–3.0 A

When the particles which are contained in the largest amount in an area from the surface layer to a depth of 3,000 nm are organic polymer particles, it is difficult to measure them with SIMS. Therefore, the same depth profile as described above is measured by XPS (X-ray photoelectron spectrometry), IR (infrared spectrometry) or the like to obtain the thickness of the surface layer while the film is being etched from the surface.

(4) Total Thickness of Film

Ten films are placed one upon another in such a manner that dust should not be entered therebetween and the total thickness of the films is measured by an intermittent electronic micrometer to calculate the thickness of each film.

(5) Young's Modulus A sample having a width of 10 mm and a length of 15 cm is cut out of the film, and this sample is pulled by an Instron-type universal tensile tester at a chuck interval of 100 mm, a pulling rate of 10 mm/min and a chart rate of 500 mm/min. The Young's modulus is calculated from the tangent of a rising portion of the obtained load-elongation curve.

(6) Electromagnetic Conversion Characteristics

The following devices are used to record a signal having a frequency of 7.4 MHz, the ratio of a 6.4 MHz value to a 7.4 MHz value of its reproduction signal is taken as the C/N of the tape, and relative C/N values when the C/N of Example 1 is 0 dB are obtained and evaluated as follows.

⊚: +3 dB or more

○: −1 to +3 dB

X: less than −1 dB

Used devices 8 mm video recorder: EDV-6000 of Sony Corp.

C/N measurement: noise meter of Shibasoku Co., Ltd.

(7) Intrinsic Viscosity of Polymer

A rough layer or a flat layer is shaved off from the laminate film, and the intrinsic viscosity of each of the thus obtained polymers is measured at 35° C. in o-chlorophenol.

(8) Slit Yield

The film is slit to a width of 700 mm and a length of 7,000 m, and the slit yield when 20 or more strips of the film are wound around a roll is obtained and evaluated based on the following criteria.

Slit yield

⊚: 90% or more

○: 70% or more and less than 90%

X: less than 70%

(9) Surface Roughness (WRa, WRz)

Using the non-contact 3-D roughness meter (TOPO-3D) of WYCO Co., 10 or more measurements (n) are made under such conditions as a measurement area of 242 μm×239 μm (0.058 mm²) and a measurement magnification of 40×, and the center plane surface roughness (WRa) and 10-point average roughness (WRz) are calculated with surface analysis software incorporated in the roughness meter.

(A) Center Plane Average Roughness (WRa)

This is an output value calculated from the following expression.

$$WRa = \sum_{k=1}^{M}\sum_{j=1}^{N} |Z_{jk} - \overline{Z}| / (M \cdot N)$$

$$\text{wherein } \overline{Z} = \sum_{k=1}^{M}\sum_{j=1}^{N} Z_{jk} / (M \cdot N)$$

$Z_{jk}$ is a height in the direction of the Z axis on the X and Y planes at a j-th position and a k-th position in each of the direction of the X axis (242 μm) and the direction of the Y axis (239 μm) perpendicular to the above direction when these directions are divided into M and N sections, respectively.

(B) 10-point Average Roughness (WRz)

The average roughness WRz is obtained by choosing ten points, the first to fifth highest peaks (Hp) and the first to fifth lowest valleys (Hv), and calculating from the following equation. $WRz=[(Hp1+Hp2+Hp3+Hp4+Hp5)-(Hv1+Hv2+Hv3+Hv4+Hv5)] \times 1/5$ (9) Uniformity in Layer Thickness 20 Points of a mill roll film are sampled at a constant interval over the entire width in a width direction, the thickness of the layer A and that of the layer B are measured in accordance with the method (2) above, and uniformity in layer thickness is evaluated from irregularities R based on the following criteria.

⊚: less than 1.0%

○: 1.0% or more and less than 2.0%

X: 2.0% or more wherein $R=[(\text{maximum}-\text{minimum})/\text{average}] \times 100$

(10) Self-recyclability

The content $W_A(I)$ of the particles I in the layer A and the content $W_B(II)$ of the particles II added at the beginning are compared with the content $W_A(II)$ of the particles I in the layer A and the content $W_B(II)$ of the particles II finally obtained when the film is recovered and recycled at a recovery shown in Table 1, respectively. When these are identical, the film is judged to be self-recyclable and not self-recyclable when these are different.

The following examples are given to further illustrate the present invention.

EXAMPLES 1 to 5

Virgin chips for a rough layer (layer B) having an intrinsic viscosity (measured in o-chlorophenol at 35° C.) of 0.61 was obtained by polymerizing dimethyl-2,6-naphthalene dicarboxylate and ethylene glycol in accordance with a commonly used method in the presence of manganese acetate as an ester interchange catalyst, antimony trioxide as a polymerization catalyst and phosphorous acid as a stabilizer and particles as a lubricant shown in Table 1. Meanwhile, chips recovered from the laminate film at a recovery shown in Table 2 and virgin chips containing no lubricant as a supplement were used to form a chip for a flat layer (layer A).

These polymers for the layers A and B were dried at 170° C. for 6 hours. The intrinsic viscosities of the layers A and B were adjusted to values shown in Table 2 by humidification. Thus, the dried chips having adjusted intrinsic viscosity were supplied to the hoppers of two extruders in such a ratio that the thickness of each layer shown in Table 1 was achieved, molten at a temperature of 280 to 300° C., co-extruded using a multi-manifold co-extrusion die in such a manner that the layer A was laminated on one side of the layer B, and extruded onto a rotary cooling drum having a surface-finish of about 0.3S and a surface temperature of 60° C. to obtain a 145 μm-thick unstretched laminate film (for Examples 1, 3 and 4) and a 97 μ-thick unstretched laminate film (for Examples 2 and 5).

The thus obtained unstretched laminate film was preheated at 120° C., stretched to 4.75 times between low-speed and high-speed rolls by heating with an IR heater having a surface temperature of 900° C. from 15 mm above, quenched and supplied to a stenter to be stretched to 5.1 times in a transverse direction at 145° C. The obtained biaxially oriented laminate film was heat set with hot air at 210° C. for 4 seconds to obtain a 6.0 μm-thick biaxially oriented laminate polyester film (for Examples 1, 3 and 4) and a 4.0 μm-thick biaxially oriented laminate polyester film (for Examples 2 and 5). The Young's modulus in a longitudinal direction of these films were 700 kg/mm$^2$ and those in a transverse direction were 730 kg/mm$^2$. The characteristic properties shown in Table 2 of these biaxially oriented laminate polyester films were measured. The results are shown in Table 2.

The following magnetic coating was applied onto one side (layer B) of each of the biaxially oriented laminate polyester films to a thickness of 0.5 μm, the coated film was subjected to alignment treatment in a DC magnetic field of 2,500 Gauss, dried by heating at 100° C. and subjected to super-calendering (linear pressure of 300 kg/cm, temperature of 80° C), and the resulting film was rolled. This roll was kept in an oven heated at 55° C. for 3 days and cut to a width of 8 mm to obtain a magnetic tape.

Preparation of Magnetic Coating

The following composition was placed in a ball mill, kneaded for 16 hours and dispersed, and 5 parts by weight of an isocyanate compound (Desmodur of Bayer AG.) were added and dispersed by high-speed shearing for 1 hour to obtain a magnetic coating.

| Composition of magnetic coatings | |
|---|---|
| needle-like Fe particles | 100 parts |
| vinyl chloride-vinyl acetate copolymer (Slec 7A of Sekisui Chemical Co., Ltd.) | 15 parts |
| thermoplastic polyurethane resin | 5 parts |
| chromium oxide | 5 parts |
| carbon black | 5 parts |
| lecithin | 2 parts |
| fatty acid ester | 1 part |
| toluene | 50 parts |
| methyl ethyl ketone | 50 parts |
| cyclohexanone | 50 parts |

The electromagnetic conversion characteristics of the obtained magnetic tape were measured in accordance with the above measurement method. The results are shown in Table 2.

Comparative Examples 1 and 2

Biaxially oriented laminate polyester films were obtained in the same manner as in Example 1 except that the lubricant particles added and the thickness of each layer were changed as shown in Table 1. Magnetic tapes were obtained using the obtained biaxially oriented laminate polyester films in the same manner as in Example 1. The measurement results of the characteristic properties of the obtained magnetic tapes are shown in Table 2.

The final composition of the lubricant obtained after the repeated self-recycling differed from the initial composition. Self-recycling was therefore impossible with this composition of the lubricant.

EXAMPLE 6

A 130 μm-thick unstretched laminate film was obtained in the same manner as in Example 1 except that the lubricant particles added and the thickness of each layer were changed as shown in Table 1. Then, a 6.0 μm-thick biaxially oriented laminate polyester film was obtained in the same manner as in Example 1 except that the thus obtained unstretched laminate film was stretched to 4.0 times in a longitudinal direction and to 5.4 times in a transverse direction. The Young's modulus in a longitudinal direction of the obtained film was 600 kg/mm$^2$ and that in a transverse direction was 900 kg/mm$^2$. Thereafter, a magnetic tape was obtained from the thus obtained biaxially oriented laminate polyester film in the same manner as in Example 1. The measurement results of the characteristic properties of the obtained magnetic tape are shown in Table 2.

TABLE 1

|  |  | Ex. 1 | Comp. Ex. 1 | Comp. Ex. 2 | Ex. 2 | Ex. 3 | Ex. 4 | Ex. 5 | Ex. 6 |
|---|---|---|---|---|---|---|---|---|---|
| Thickness of each layer |  |  |  |  |  |  |  |  |  |
| Layer A | μm | 5.00 | 5.00 | 5.00 | 3.50 | 5.00 | 5.00 | 3.50 | 5.00 |
| Layer B | μm | 1.00 | 1.00 | 1.00 | 0.50 | 1.00 | 1.00 | 0.50 | 1.00 |
| Total thickness | μm | 6.00 | 6.00 | 6.00 | 4.00 | 6.00 | 6.00 | 4.00 | 6.00 |
| Layer A |  |  |  |  |  |  |  |  |  |
| Particles I |  |  |  |  |  |  |  |  |  |
| Species of lubricant |  | cross-linked silicone resin | cross-linked silicone resin | cross-linked silicone resin | cross-linked silicone resin | cross-linked silicone resin | cross-linked silicone resin | cross-linked polystyrene | spherical silica |
| Average particle diameter | μm | 0.50 | 0.50 | 0.50 | 0.50 | 0.50 | 0.50 | 0.60 | 0.30 |
| Content $W_A$ (I) | wt % | 0.0182 | 0.0150 | 0.0182 | 0.0024 | 0.0182 | 0.0182 | 0.0024 | 0.1867 |
| Particles II |  |  |  |  |  |  |  |  |  |
| Species of lubricant |  | spherical silica | spherical silica | spherical silica | alumina | spherical silica | spherical silica | alumina | spherical silica |
| Average particle diameter | μm | 0.10 | 0.10 | 0.10 | 0.10 | 0.10 | 0.10 | 0.10 | 0.10 |
| Content $W_A$ (II) | wt % | 0.126 | 0.150 | 0.126 | 0.295 | 0.126 | 0.126 | 0.0295 | 0.2333 |
| Layer B |  |  |  |  |  |  |  |  |  |
| Particles I |  |  |  |  |  |  |  |  |  |
| Species of lubricant |  | cross-linked silicone resin | cross-linked silicone resin | cross-linked silicone resin | cross-linked silicone resin | cross-linked silicone resin | cross-linked silicone resin | cross-linked polystyrene | spherical silica |
| Average particle diameter | μM | 0.50 | 0.50 | 0.50 | 0.50 | 0.50 | 0.50 | 0.60 | 0.30 |
| Content $W_B$ (I) | wt % | 0.039 | 0.039 | 0.035 | 0.025 | 0.039 | 0.039 | 0.025 | 0.400 |
| Particles II |  |  |  |  |  |  |  |  |  |
| Species of lubricant |  | spherical silica | spherical silica | spherical silica | alumina | spherical silica | spherical silica | alumina | spherical silica |
| Average particle diameter | μm | 0.10 | 0.10 | 0.10 | 0.10 | 0.10 | 0.10 | 0.10 | 0.10 |
| Content $W_B$ (II) | wt % | 0.270 | 0.270 | 0.270 | 0.310 | 0.270 | 0.270 | 0.310 | 0.500 |
| $W_A$ (I)/$W_A$ (II) | — | 0.144 | 0.100 | 0.144 | 0.081 | 0.144 | 0.144 | 0.081 | 0.800 |
| $W_B$ (I)/$W_B$ (II) | — | 0.144 | 0.144 | 0.130 | 0.081 | 0.144 | 0.144 | 0.081 | 0.800 |
| Intrinsic viscosity |  |  |  |  |  |  |  |  |  |
| Layer A $\eta_A$ |  | 0.56 | 0.56 | 0.56 | 0.59 | 0.56 | 0.56 | 0.59 | 0.56 |
| Layer B $\eta_B$ |  | 0.56 | 0.56 | 0.56 | 0.59 | 0.58 | 0.63 | 0.52 | 0.63 |
| Difference of viscosity $|\eta_A - \eta_B|$ |  | 0.00 | 0.00 | 0.00 | 0.00 | 0.02 | 0.07 | 0.07 | 0.07 |

Ex.: Example; Comp. Ex: Comparative Example

TABLE 2

|  |  | Ex. 1 | Comp. Ex. 1 | Comp. Ex. 2 | Ex. 2 | Ex. 3 | Ex. 4 | Ex. 5 | Ex. 6 |
|---|---|---|---|---|---|---|---|---|---|
| Surface roughness |  |  |  |  |  |  |  |  |  |
| Layer A |  |  |  |  |  |  |  |  |  |
| WRa | nm | 3.5 | 3.0 | 3.4 | 1.5 | 3.5 | 3.5 | 1.5 | 4.5 |
| WRz | nm | 90 | 80 | 85 | 25 | 90 | 90 | 25 | 45 |
| Layer B |  |  |  |  |  |  |  |  |  |
| WRa | nm | 5.0 | 5.0 | 4.8 | 4.0 | 5.0 | 5.0 | 4.0 | 6.5 |
| WRz | nm | 130 | 130 | 110 | 90 | 130 | 130 | 90 | 55 |

TABLE 2-continued

|  |  | Ex. 1 | Comp. Ex. 1 | Comp. Ex. 2 | Ex. 2 | Ex. 3 | Ex. 4 | Ex. 5 | Ex. 6 |
|---|---|---|---|---|---|---|---|---|---|
| Self-recycling and recovery |  |  |  |  |  |  |  |  |  |
| Recovery method |  |  |  |  |  |  |  |  |  |
| Recovered layer |  | layer A | layer A | layer A | layer A | layer A | layer A | layer A | layer A |
| Recovery | % | 70 | 70 | 70 | 40 | 70 | 70 | 40 | 70 |
| Final composition of recovered layer |  |  |  |  |  |  |  |  |  |
| Content $W_A$ (I) | wt % | 0.0182 | 0.0182 | 0.0163 | 0.0024 | 0.0182 | 0.0182 | 0.0024 | 0.1867 |
| Content $W_A$ (II) | wt % | 0.126 | 0.126 | 0.126 | 0.0295 | 0.126 | 0.126 | 0.0295 | 0.2333 |
| Self-recyclability |  | ○ | × | × | ○ | ○ | ○ | ○ | ○ |
| Uniformity in layer thickness |  | ⊚ | ⊚ | ⊚ | ⊚ | ⊚ | ○ | ○ | ○ |
| Electromagnetic conversion property |  | ○ | ○ | ○ | ⊚ | ○ | ○ | ⊚ | ○ |
| Slit yield |  | ⊚ | ⊚ | ⊚ | ○ | ⊚ | ⊚ | ○ | ⊚ |

As is evident from Tables 1 and 2, the biaxially oriented laminate polyester film of the present invention is self-recyclable, provides a magnetic tape having excellent electromagnetic conversion characteristics, and has excellent winding properties.

According to the present invention, a biaxially oriented laminate polyester film which is self-recyclable can be obtained, and a film can be obtained that has excellent electromagnetic conversion characteristics and winding properties as a base film for a high-density magnetic recording medium.

This biaxially oriented laminate polyester film is useful as a base film for a high-density magnetic recording medium, particularly a base film for such magnetic tapes as ½-inch video tape, 8 mm video tape, data cartridge tape and digital video tape.

What is claimed is:

1. A biaxially oriented laminate polyester film which is composed of polyester compositions and comprises two adjacent layers that differ from each other in surface roughness, wherein:

each of the layers contains at least two different lubricant particles, and each of two members out of the lubricant particles of one layer and each of two members out of the lubricant particles of the other layer have the same substrates and the same average particle diameters, respectively, and are contained in such amounts that satisfy the following expressions (1) to (3):

$$W_A(I)/W_A(II)=(0.95-1.05) \times W_B(I)/W_B(II) \quad (1)$$

$$W_A(I) < W_B(I) \quad (2)$$

$$W_A(II) < W_B(II) \quad (3)$$

wherein $W_A(I)$ is a content (wt %) of lubricant particles I having the largest average particle diameter out of the lubricant particles contained in the first layer (layer A), $W_A(II)$ is a content (wt %) of lubricant particles II having the second largest average particle diameter out of the lubricant particles contained in the first layer, $W_B(I)$ is a content (wt %) of lubricant particles I having the largest average particle diameter out of the lubricant particles contained in the second layer (layer B), and $W_B(II)$ is a content (wt %) of lubricant particles II having the second largest average particle diameter out of the lubricant particles contained in the second layer.

2. The laminate polyester film of claim 1, wherein a difference in an intrinsic viscosity of polyesters forming the adjacent two layers is 0.1 or less.

3. The laminate polyester film of claim 1, wherein part of a polyester composition forming the first layer is a recovered polyester composition having the same composition as the laminate polyester film of claim 1.

4. The laminate polyester film of claim 1, wherein the average particle diameter of the lubricant particles I having the largest average particle diameter contained in each of the polyester compositions of the first and second layers is 0.1 to 2.0 μm.

5. The laminate polyester film of claim 1, wherein the content ($W_A(I)$) of the lubricant particles I having the largest average particle diameter contained in the polyester composition of the first layer is 0.0005 to 0.6 wt %, based on the polyester composition.

6. The laminate polyester film of claim 1, wherein the content ($W_B(I)$) of the lubricant particles I having the largest average particle diameter contained in the polyester composition of the second layer is 0.005 to 1.0 wt %, based on the polyester composition.

7. The laminate polyester film of claim 1, wherein the average particle diameter of the lubricant particles II having the second largest average particle diameter contained in each of the polyester compositions of the first and second layers is 0.01 to 1.0 μm.

8. The laminate polyester film of claim 1, wherein the content ($W_A(II)$) of the lubricant particles II having the second largest average particle diameter contained in the polyester composition of the first layer is 0.005 to 1.0 wt %, based on the polyester composition.

9. The laminate polyester film of claim 1, wherein the content ($W_B(II)$) of the lubricant particles II having the second largest average particle diameter contained in the polyester composition of the second layer is 0.05 to 2.0 wt %, based on the polyester composition.

10. The laminate polyester film of claim 1, wherein the lubricant particles having the largest average particle diameter contained in each of the polyester compositions of the first and second layers have a standard deviation value of 0.5 or less.

11. The laminate polyester film of claim 1, wherein the lubricant particles having the second largest average particle diameter contained in each of the polyester compositions of the first and second layers have a standard deviation value of 0.5 or less.

12. The laminate polyester film of claim 1, wherein the surface roughness (WRa(A)) of the first layer is in the range of 0.5 to 5 nm, the surface roughness (WRa(B)) of the second layer is in the range of 2 to 7 nm, and the surface roughness of the first layer is smaller than the surface roughness of the second layer.

13. The laminate polyester film of claim 1, which has a thickness of 2 to 10 $\mu$m.

14. The laminate polyester film of claim 1, wherein the thickness of the first layer is larger than the thickness of the second layer, and the thickness of the second layer is in the range of 0.1 to 5 $\mu$m.

15. The laminate polyester film of claim 1, wherein polyesters in the polyester compositions of each of the first and second layers are polyethylene-2,6-naphthalene dicarboxylate.

16. The laminate polyester film of claim 1, wherein the Young's modulus in longitudinal and transverse directions of the film are each in the range of 450 to 2,000 kg/mm$^2$, and the ratio of the Young's modulus in a transverse direction to the Young's modulus in a longitudinal direction is in the range of 0.4 to 3.0.

* * * * *